United States Patent [19]
Lew

[11] Patent Number: 5,863,599
[45] Date of Patent: Jan. 26, 1999

[54] SUN PROTECTOR

[76] Inventor: Chel Wing Lew, 9218 Old Homestead Rd., San Antonio, Tex. 78230

[21] Appl. No.: 780,590

[22] Filed: Jan. 8, 1997

[51] Int. Cl.$^6$ ....................................................... B05D 5/00
[52] U.S. Cl. ........................ 427/154; 427/160; 427/345.5; 166/157.8; 166/218; 166/241; 522/135; 524/94; 524/59
[58] Field of Search ................................. 427/385.5, 160, 427/154; 524/94, 359; 523/135; 106/124.1, 157.8, 218, 241

[56] References Cited

U.S. PATENT DOCUMENTS

| | | | |
|---|---|---|---|
| 400,148 | 12/1889 | Pond et al. | 427/160 |
| 3,702,775 | 11/1972 | Stewart | 427/64 |
| 3,987,001 | 10/1976 | Wedel et al. | 427/162 |
| 4,146,658 | 3/1979 | Humphrey | 427/160 |
| 4,160,061 | 7/1979 | Okino et al. | 428/334 |
| 4,168,332 | 9/1979 | Leinen et al. | 427/160 |
| 4,208,465 | 6/1980 | Chang | 427/160 |
| 4,241,108 | 12/1980 | Tracy et al. | 260/32.8 R |
| 4,496,611 | 1/1985 | Kawakubo et al. | 427/160 |
| 4,604,297 | 8/1986 | Liu . | |
| 5,063,112 | 11/1991 | Gross et al. | 427/160 |

*Primary Examiner*—Janyce Bell
*Attorney, Agent, or Firm*—Madan & Morris, PLLC

[57] ABSTRACT

The present invention provides a film for application to a surface of a material capable of transmitting heat and/or light. The film comprises: a solvent comprising at least one volatile organic compound in an amount sufficient to maintain flowability of the film after exposure to air and for a time sufficient to apply the film to the surface, whereupon the solvent evaporates and dries the film; a polymer in an amount sufficient to reversibly bind the film to the surface; and, an ultraviolet absorbent material in an amount sufficient to reduce transmission of said energy through said material. The film may be applied and removed upon demand by the user.

24 Claims, No Drawings

SUN PROTECTOR

FIELD OF THE INVENTION

The present invention relates to films that may be easily applied and removed from the surface of a transmissive material, preferably glass, to prevent the transmission of heat and/or UV light through the transmissive material.

BACKGROUND OF THE INVENTION

Often, it is desirable for glass plates or windows used in buildings, cars, etc. to be light and/or heat reflecting. Various methods and compositions have been used to vary the light and/or heat reflecting properties of glass plates that are consistently exposed to sunlight.

Methods have been developed to coat glass plates with heat and/or light reflective material. However, the methods and compositions that have been developed to date generally require a thermal decomposition step, during which the glass plate is heated to about 400° C. As a result, most of such methods are restricted to the factory.

One type of commercially available device for temporary use is a roll of translucent darkened plastic sheeting provided with suction cups and/or VELCRO fixtures to attach the darkened plastic sheeting to and/or remove the sheeting from a glass surface. Although this type of darkened plastic sheeting may reduce the transmission of light and/or heat through the glass, this type of plastic sheeting is cumbersome to apply and typically can be applied only to a very limited surface area. Also, many states outlaw the application of fixtures, such as plastic sheeting, to the front windshield of a vehicle.

A heat and/or light reflective film that could be easily applied to and removed from glass on demand by the consumer would be highly desirable.

SUMMARY OF THE INVENTION

The present invention provides a film for application to a surface of a material that transmits energy selected from the group consisting of heat, light, and a combination thereof, the film comprising: a solvent comprising at least one volatile organic compound in an amount sufficient to maintain flowability of the film after exposure to air and for a time sufficient to apply the film to the surface, whereupon the solvent evaporates and dries the film; a polymer in an amount sufficient to reversibly bind the film to the surface; and, an ultraviolet absorbent material in an amount sufficient to reduce transmission of said energy through the material.

DETAILED DESCRIPTION OF THE INVENTION

The present invention provides a film which can be reversibly applied to and removed from a transmissive surface, such as the surface of a glass plate. The film includes an ultraviolet absorbent material, a polymer which binds the film to the transmissive surface, and a solvent. The solvent should provide sufficient flowability to apply the film with a brush, sponge, or other applicator, but which also should be sufficiently volatile to rapidly evaporate for quick drying of the film once the film is applied. In a preferred embodiment, the solution, before evaporation, comprises: between about 4–10 wt % polymer; between about 30–60 wt % water; between about 25–60 wt % volatile solvent, and between about 10–50 wt % UV absorbent material. In a preferred embodiment, the solution before evaportion comprises: between about 5–8 wt % polymer, between about 35–45 wt % water, between about 25–40 wt % volatile solvent, and about 20 wt % UV absorbent material.

The polymer or binder may have variable solubility in alcohol and/or water, depending upon how the film is to be removed from the surface. For example, if the film will be removed by washing the surface with cold water, the polymer or binder should be soluble in both cold water and in the volatile solvent. If it is preferred that the film be capable of withstanding rain or other exposure to water, then the polymer or binder should be water insoluble. Persons of ordinary skill in the art will recognize the variety of solubility options available depending upon the particular use for the coated transmissive material. For example, the polymer may be: alcohol and hot and/or cold water soluble; alcohol soluble but water insoluble; hot and/or cold water soluble but only slightly alcohol soluble; etc. In a preferred embodiment, the polymer is both water and alcohol soluble.

Examples of suitable polymers/binders include, but are not necessarily limited to: polyvinyl derivatives, such as polyvinyl alcohol, polyvinylpyrrolidone, and polyvinyl acetate; cellulose derivatives, such as hydroxyethylcellulose, hydroxypropylcellulose, methyl cellulose, hydroxy propyl methyl cellulose, ethyl cellulose, ethyl hydroxyethylcellulose, and sodium carboxymethyl cellulose; polyethylene derivatives, such as polyethylene glycol and polyethylene oxide; resinous gums, such as shellac; and, resinous proteins, such as zein.

Commercially available polymers suitable for use in the present invention include, but are not necessarily limited to, the ELVANOL line of products sold by Dupont deNemours Co., Wilmington, Del., and the MOWIOL line of products sold by Hoescht Celanese Corp., Charlotte, N.C. Such products include, but are not necessarily limited to, ELVANOL 50-42, ELVANOL 52-22, and MOWIOL 3-83. Other sources of suitable polymer materials include, but are not necessarily limited to: the AIRVOL line of products, available from Air Products, Inc. of Allentown, Pa.; the GELVATOL line of products, available from Monsanto, St. Louis, Mo.; and, the LEMOL line of products, available from Borden's Chemical Co., Leominster, Mass. Preferably, the solution should have as low a polymer content as possible due to the expense of the polymer, but the solution should have a high enough viscosity that the film does not run or drip when applied and to reduce the drying time.

Suitable solvents include, but are not necessarily limited to alcohols, ketones, esters, chlorinated hydrocarbons, ethers, and hydrocarbons. Specific examples of such solvents include acetone, ethyl acetate, methylene chloride, chloroform, tetrachloroethylene, CELLOSOLVE (an ether available from Union Carbide Chemicals & Plastics Co., Inc.), and toluene. A preferred solvent is a mixture of between about 40–50% water and between about 50–60% isopropyl alcohol. The foregoing mixture is preferred because the mixture is: environmentally safe; should not harm most painted surfaces; contains components that are easy to obtain; and, the film produced by the mixture may be redissolved in materials that are readily available to consumers—i.e., rubbing alcohol, which is 70% isopropyl alcohol, and 30% water.

Substantially any ultraviolet absorbent material may be used, including but not limited to titanium dioxide, zinc oxide, and carbon black. Because it is the least expensive, a preferred UV absorbent material is titanium dioxide.

Other additives that may or may not be desirable depending upon the application include, but are not necessarily limited to:

Molding release agents, which aid in removing the film from the surface. Examples include, but are not necessarily limited to silicone oils, and other types of oils, fats, or surfactants (e.g., TRITON X-100, ALKANOL, etc.);

Plasticizers, which make the film less brittle upon drying. Examples include, but are not necessarily limited to propylene glycol, polyethylene glycol, glycerin, and sugar;

Pigments, which add a desired color to the film. Examples include, but are not necessarily limited to water soluble dyes, clays, and water insoluble pigments. Care should be used to select a dye that does not contain salts that will interfere with the binding of the film to the surface and/or with the UV absorbance of the film;

Antifoaming agents, which avoid bubbling of the film upon application. Examples include, but are not necessarily limited to fatty alcohols and silicone;

Preservatives and/or mold inhibitors, which prevent the growth of biological contaminants. Examples include, but are not necessarily limited to: DOWICIDE™, available from Dow Chemical Co.; sodium propionate, such as MYCOBAN™, available from Dupont; and, the fungicide salicylanilide, such as SHIRLAN™, also available from Dupont.

Film enhancers, which enhance the smoothness and strength of the film upon application. Examples include, but are not necessarily limited to cellulose fibers and filaments; and Other ingredients, such as colors, pigments, etc., as desired.

The solution preferably should be prepared by weighing an appropriate amount of water and slowly high shear mixing the polymer into the water. Thereafter, the alcohol or other volatile solvent may be added to a desired concentration. Alternately, the water and alcohol can be combined, and the polymer can be slowly added to the solution by high shear mixing. Once the water, alcohol, and polymer are mixed, the UV absorbent and other additives may be added. Slight heating (<100° F.) may be used as an aid to dissolve the dehydrated polymer into the water/alcohol mixture. However, the film should be easily redissolvable by the consumer, and redissolution should not require stringent conditions, such as heat and/or a high shear mixer.

Specific examples of suitable sun protector solutions are:
1. A low viscosity sun protector film:
7.2 wt % MOWIOL 3-83 (polyvinyl alcohol);
20 wt % DuPont R-900 (wettable titanium dioxide);
36.4 wt % water (preferably distilled),
36.4 wt % isopropyl alcohol.
2. A medium viscosity sun protector film:
7.6 wt % ELVANOL (52-22 polyvinyl alcohol);
20 wt % Dupont R-900 (wettable titanium dioxide);
43.4 wt % water (preferably distilled);
29.0 wt % isopropyl alcohol.
3. A high viscosity sun protector film:
5.6 wt % ELVANOL (50-42 polyvinyl alcohol);
20.0 wt % DuPont R-900 (wettable titanium dioxide);
44.6 wt % water (preferably distilled);
29.8 wt % isopropyl alcohol.

Of the foregoing, (3) is preferred because ELVANOL 50-42 contains a high molecular weight polyvinyl alcohol (PVA), which results in a more viscous solution [44-52 centipoises at about 7° C. (20° F.) for a 4% water solution] even though the solids content is lower (3–5%). The higher the solids content of the PVA product, the higher the cost of the product. It is preferable to minimize the solids content for economic reasons, but also to use a product with a relatively high a viscosity. MOWIOL 3-83 is a low viscosity PVA [5–6 centipoises at about 7° C. (20° F.) for a 4% water solution], even though it has a higher solids content than ELVANOL 50-42. ELVANOL 52-22 is only a medium viscosity PVA [23–27 centipoises at about 7° C. (20° F.) for a 4% water solution], but the solids content is over ten times higher than the solids content of ELVANOL 5-42.

Partially hydrolyzed grades of PVA are preferred due to their remoistenable adhesive properties. Partially hydrolyzed grades of PVA are more sensitive to cold water than completely hydrolyzed grades. The best adhesion to a smooth non-absorbent surface will be obtained using a partially hydrolyzed grade of PVA.

Persons of ordinary skill in the art will recognize that many modifications may be made to the present invention without departing from the spirit and scope of the present invention. The embodiment described herein is meant to be illustrative only and should not be taken as limiting the invention, which is defined in the following claims.

I claim:

1. A coating composition for application to a surface of a material that transmits energy selected from the group consisting of heat, light, and a combination thereof, said coating composition comprising:

a first solvent comprising at least one volatile organic compound in an amount sufficient to maintain flowability of said coating composition after exposure to air and for a time sufficient to apply said coating composition to said surface, whereupon said first solvent evaporates, and said coating composition dries, leaving a film on said surface;

a polymer which is soluble in a second solvent selected from the group consisting of water, alcohol, and a combination thereof, wherein said polymer has adhesion and solubility properties and is present in an amount sufficient to reversibly bind said film to said surface until dissolution of said polymer in said second solvent; and, an ultraviolet absorbent material in an amount sufficient to reduce transmission of said energy through said material.

2. The coating composition of claim 1 wherein said first solvent comprises materials is selected from the group consisting of water, alcohols, ketones, esters, chlorinated hydrocarbons, ethers, and hydrocarbons and combinations thereof.

3. The coating composition of claim 1 wherein said ultraviolet absorbent material is selected from the group consisting of titanium dioxide, zinc oxide, and a carbon black.

4. The coating composition of claim 1 wherein said first solvent comprises materials selected from the group consisting of alcohol, water, and a combination thereof.

5. The coating composition of claim 1 further comprising one or more additive selected from the group consisting of a molding releasing agent, a plasticizer, a pigment, an antifoaming agent, a preservative, a mold inhibitor, and a film enhancer.

6. A coating composition for application to a surface of a material that transmits energy selected from the group consisting of heat, light, and a combination thereof, said coating composition comprising:

a first solvent comprising at least one volatile organic compound in an amount sufficient to maintain flowability of said coating composition after exposure to air for a time sufficient to apply said coating composition to said surface whereupon said first solvent evaporates and said coating composition dries, leaving a film on said surface;

a polymer which is soluble in a second solvent selected from the group consisting of water, alcohol, and a combination thereof, wherein said polymer has adhesion and solubility properties and is present in an amount sufficient to reversibly bind said film to said surface until dissolution of said polymer in said second solvent, said polymer being selected form the group consisting of a polyvinyl derivative, a cellulose derivative, a polyethylene derivative, a resinous gum, and a resinous protein; and, an ultraviolet absorbent material in an amount sufficient to reduce transmission of said energy through said material.

7. The coating composition of claim 6 wherein said first solvent comprises materials selected from the group consisting of alcohol, water, and a combination thereof.

8. The coating composition of claim 6 wherein said first solvent comprises a mixture of alcohol and water.

9. A coating composition for application to a surface of a material that transmits energy selected from the group consisting of heat, light, and a combination thereof, said coating composition comprising:

a solvent comprising at least one volatile organic compound in an amount sufficient to maintain flowability of said coating composition after exposure to air and for a time sufficient to apply said coating composition to said surface, whereupon said solvent evaporates and said coating composition dries, leaving a film on said surface;

a polymer in an amount sufficient to reversibly bind said film to said surface, said polymer comprising a polyvinyl derivative selected from the group consisting of polyvinyl alcohol, polyvinylpyrrolidone, and polyvinyl acetate; and, an ultraviolet absorbent material in an amount sufficient to reduce transmission of said energy through said material.

10. The coating composition of claim 9 wherein said first solvent comprises materials selected from the group consisting of alcohol, water, and a combination thereof.

11. The coating composition of claim 9 wherein said first solvent comprises a mixture of alcohol and water.

12. A coating composition for application to a surface of a material that transmits energy selected from the group consisting of heat, light, and a combination thereof, said coating composition comprising:

a solvent comprising at least one volatile organic compound in an amount sufficient to maintain flowability of said coating composition after exposure to air and for a time sufficient to apply said coating composition to said surface, whereupon said solvent evaporates and said coating composition dries, leaving a film on said surface;

a polymer in an amount sufficient to reversibly bind said film to said surface, said polymer comprising a cellulose derivative selected from the group consisting of hydroxyethylcellulose, hydroxypropylcellulose, methyl cellulose, hydroxy propyl methyl cellulose, ethyl cellulose, ethyl hydroxyethylcellulose, and sodium carboxymethyl cellulose; and, an ultraviolet absorbent material in an amount sufficient to reduce transmission of said energy through said material.

13. A coating composition for application to a surface of a material that transmits energy selected from the group consisting of heat, light, and a combination thereof, said coating composition comprising:

a solvent comprising at least one volatile organic compound in an amount sufficient to maintain flowability of said coating composition after exposure to air and for a time sufficient to apply said coating composition to said surface, whereupon said solvent evaporates and said coating composition dries, leaving a film on said surface;

a polymer in an amount sufficient to reversibly bind said film to said surface, said polymer comprising a polyethylene derivative selected from the group consisting of polyethylene glycol and polyethylene oxide; and, an ultraviolet absorbent material in an amount sufficient to reduce transmission of said energy through said material.

14. A coating composition for application to a surface of a material that transmits energy selected from the group consisting of heat, light, and a combination thereof, said coating composition comprising:

a solvent comprising at least one volatile organic compound in an amount sufficient to sufficient to apply said coating composition to said surface, whereupon said solvent evaporates and dries said coating composition, leaving a film on said surface;

a polymer in an amount sufficient to reversibly bind said film to said surface, said polymer being selected from the group consisting of shellac and zein; and, an ultraviolet absorbent material in an amount sufficient to reduce transmission of said energy through said material.

15. A coating composition for application to a surface of a material that transmits energy selected from the group consisting of heat, light, and a combination thereof, said coating composition comprising:

a first solvent comprising at least one alcohol in an amount sufficient to maintain flowability of said coating composition after exposure to air and for a time sufficient to apply said coating composition to said surface, whereupon said first solvent evaporates and said coating composition dries, leaving a film on said surface;

a polymer which is soluble in a second solvent selected from the group consisting of water, alcohol, and a combination thereof, wherein said polymer has adhesion and solubility properties and is present in an amount sufficient to reversibly bind said film to said surface until dissolution of said polymer in said second solvent; and, an ultraviolet absorbent material in an amount sufficient to reduce transmission of said energy through said material.

16. The coating composition of claim 15 wherein said first solvent further comprises water.

17. A method for reducing transmission of energy selected from the group consisting of heat, light, and a combination thereof through a transmissive material comprising:

applying to a surface of said transmissive material a coating composition comprising a first solvent comprising at least one volatile organic compound in an amount sufficient to maintain flowability of said coating composition after exposure to air and for a time sufficient to apply said coating composition to a surface of said material, whereupon said first solvent evaporates and said coating composition dries, leaving a film on said surface;

a polymer which is soluble in a second solvent selected from the group consisting of water, alcohol, and a combination thereof, wherein said polymer has adhesion and solubility properties and is present in an amount sufficient to reversibly bind said film to said surface until dissolution of said polymer in said second solvent; and, an ultraviolet absorbent material in an amount sufficient to reduce transmission of said energy through said material.

18. The method of claim 17 further comprising removing said film from said surface.

19. The method of claim 18 further comprising redissolving said film in said solvent, forming a redissolved film.

20. The method of claim 19 further comprising applying said redissolved film to a surface of a transmissive material.

21. A The method of claim 17 wherein said polymer is a polyvinyl derivative.

22. The method of claim 21 wherein said polymer is selected from the group consisting of a cellulose derivative, a polyethylene derivative, a resinous gum, and a resinous protein.

23. The method of claim 21 wherein said polyvinyl derivative is selected from the group consisting of polyvinyl alcohol, polyvinylpyrrolidone, and polyvinyl acetate.

24. The method of claim 22 wherein said polymer is selected from the group consisting of:

a cellulose derivative selected from the group consisting of hydroxyethylcellulose, hydroxypropylcellulose, methyl cellulose, hydroxy propyl methyl cellulose, ethyl cellulose, ethyl hydroxyethylcellulose, and sodium carboxymethyl cellulose;

a polyethylene derivative selected from the group consisting of polyethylene glycol and polyethylene oxide; and shellac and zein.

* * * * *